United States Patent [19]
Tittgemeyer

[11] Patent Number: 5,316,798
[45] Date of Patent: May 31, 1994

[54] METHOD OF MAKING A CYLINDRICAL SLEEVE STRUCTURE, PARTICULARLY COVER FOR AN OFFSET CYLINDER IN A ROTARY PRINTING MACHINE

[75] Inventor: Udo Tittgemeyer, Arnsberg, Fed. Rep. of Germany

[73] Assignee: MAN Roland Druckmaschinen AG, Offenbach am Main, Fed. Rep. of Germany

[21] Appl. No.: 864,407

[22] Filed: Apr. 6, 1992

Related U.S. Application Data

[63] Continuation-in-part of Ser. No. 494,129, Mar. 15, 1990, abandoned.

[30] Foreign Application Priority Data

Mar. 18, 1989 [DE] Fed. Rep. of Germany ....... 3908999

[51] Int. Cl.$^5$ ............................................. B05D 1/36
[52] U.S. Cl. ................................ 427/409; 427/373; 427/412.1; 492/48
[58] Field of Search ............... 427/244, 247, 373, 409, 427/412.1, 387, 388.2, 393.5; 428/36.5, 909; 492/48

[56] References Cited

U.S. PATENT DOCUMENTS

| | | | |
|---|---|---|---|
| 1,141,320 | 6/1915 | Crump | 118/409 |
| 2,235,250 | 3/1941 | Bingham et al. | 118/409 |
| 3,091,551 | 5/1963 | Robertson | 427/244 |
| 3,656,999 | 4/1972 | Lundsager | 427/386 |
| 3,767,457 | 10/1973 | Hubbard, Jr. et al. | 427/355 |
| 4,043,013 | 8/1977 | Zeppernick et al. | 29/132 |
| 4,303,721 | 12/1981 | Rodriguez | 428/213 |
| 4,913,048 | 4/1990 | Tittgemeyer | 101/141 |

FOREIGN PATENT DOCUMENTS

| | | | |
|---|---|---|---|
| 885401 | 11/1975 | Canada | 427/373 |
| 2708689 | 9/1977 | Fed. Rep. of Germany. | |
| 3027549C2 | 2/1980 | Fed. Rep. of Germany. | |
| 7802683 | 4/1981 | Fed. Rep. of Germany. | |
| 3543704A1 | 6/1987 | Fed. Rep. of Germany. | |
| 2089288 | 6/1982 | United Kingdom. | |

*Primary Examiner*—Terry J. Owens
*Attorney, Agent, or Firm*—Frishauf, Holtz, Goodman & Woodward

[57] ABSTRACT

A cover layer, for example applied to a carrier sleeve (3), is volume compressible by being formed as a unitary seamless cover layer (3) of foamed or expanded or blown material resulting in micropores or microcells of less than 0.01 mm, with a percentage of closed or individual cells to total cells being greater than 50%. This cover layer will have a bounce-back or rebound elasticity of greater than 95% and preferably has a thickness of between about 1 to 5 mm. It may be covered with a polyurethane or rubber based outer cover layer of, for example, about less than 0.5 mm thickness. The cover layer is applied by providing a base substance which is made thixotropic, stirring it and applying it in liquid form as a spiral stripe on a rotating and axially moving cylinder (5), the material being free foaming and curing as it is being applied, and when still in spreadable and somewhat flowable condition to form a uniform seamless cover layer which includes individual, unconnected micropores or microcells. Additives such as talcum, and suitable selection of curing agents or activators and inhibitors, as well as blowing agents can control the size and eventual density of the material.

13 Claims, 1 Drawing Sheet

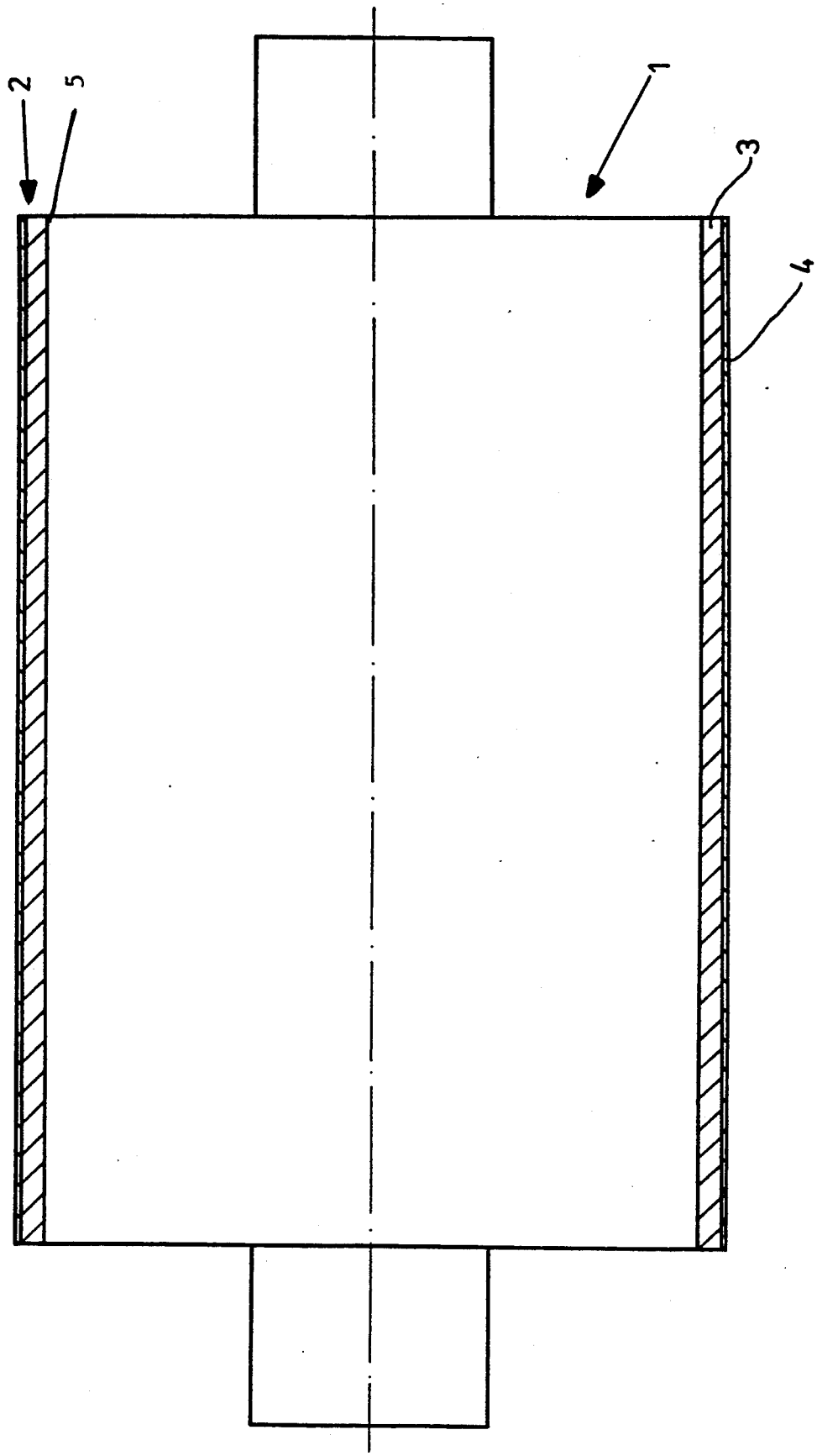

METHOD OF MAKING A CYLINDRICAL SLEEVE STRUCTURE, PARTICULARLY COVER FOR AN OFFSET CYLINDER IN A ROTARY PRINTING MACHINE

This is a continuation-in-part application of U.S. application Ser. No. 07/494,129, filed Mar. 15, 1990, now abandoned.

Reference to related publications

German Patent Disclosure Document DE-OS 27 08 689. Textbook, Walenski: "Einführung in den Offsetdruck" ("Introduction to Offset Printing"), published by Hanns Eggen GmbH & Co. KG, Hannover, Fed. Rep. Germany, pp. 262, 263. CRC Handbook of Chemistry and Physics, 62nd edition, 1981, page E-32.

FIELD OF THE INVENTION

The present invention relates to a method of making a cylindrical sleeve structure for an offset cylinder of a rotary printing machine, and more particularly to such a sleeve structure which has a resiliently compressible cover.

BACKGROUND

Blanket cylinders of offset printing machines can be an endless, cylindrical sleeve or an interrupted cover, clamped in a clamping groove. German Patent Disclosure Document DE-OS 27 08 689 describes an offset printing machine having a continuous cylindrical cover which is replaceable applied on an offset printing cylinder. Elastic materials are used for the coating.

The referenced textbook, Walenski: "Einführung in den Offsetdruck" ("Introduction to Offset Printing"), published by Hanns Eggen GmbH & Co. KG, Hannover, Fed. Rep. Germany, pp. 262, 263, describes rubber blankets for use in customary offset rotary printing machines which are elastically deformable, but not volume compressible. Rubber blankets of this type are referred to as incompressible or non-compressible blankets. Only gaseous materials are volume compressible. Liquids and solid materials are not volume compressible. Rubber blankets having intermediate rubber layers of micro-compressible, volume compressible material, connected by air channels or pores, have not found acceptance in offset printing machine sleeves. Use of customary, that is, elastic but not volume compressible material, is not suitable since, in contrast to blankets which are clamped in clamping grooves, continuous sleeves do not permit release of tension or bulges which form in operation. Practical use of coated, continuous carrier sleeves, particularly for wide or axially long printing cylinders was not possible. Such sleeves could not be made, either in form of a compact inherently elastic sleeve, or as an elastic coating on a sleeve, and foamed coatings were impossible to use.

Customary materials in order to make foamed structures, such as cast polyurethane, had been considered. Yet, use of previously known volume compressible material was not economically possible, even if,.theoretically, the technical use would have been possible.

THE INVENTION

It is an object to provide method to make a cylindrical sleeve in which known difficulties of offset print subject matter carriers do not arise, which are economical in manufacture and provide for desirable roll-off and printing to thereby result in improved printing quality of a resulting printed product.

Briefly, a cylindrical carrier has a cylindrical cover placed thereover which is formed of a multi-component material having a foam of a base substance which becomes volume compressible during its application. The foam substance includes a blowing agent and an inhibitor, both applied by free foaming on the surface of the carrier. In accordance with a feature of the invention, the carrier is rotated and a thixotropic base substance, in liquid form, is applied thereon in a spiral stripe, for example by axially feeding or translating the carrier as it rotates, the thixotropic substance, including the blowing agent and inhibitor, being applied in an essentially spiral layer in a condition in which it is still spreadable and somewhat flowable to form a uniform cover over the cylindrical carrier.

The resulting structure, made by the method, has the advantage of low damping and high rebound or bounce-back elasticity.

"Free foaming" as used herein means that the material is applied and can foam as it is being applied, without constraint by a mold, that is, is free to form microcells or micropores, not externally constrained but inherent in the material as it is formed and, if of the curing type, as it foams and cures.

BRIEF DESCRIPTION OF THE DRAWING

The single FIGURE is a highly schematic cross-sectional view through a carrier sleeve forming an offset sleeve cover for an offset cylinder of a rotary offset printing machine, in which the offset cylinder has been omitted and is shown, schematically, only by its center line and shaft extensions.

DETAILED DESCRIPTION

An offset printing machine cylinder 1, for example as used in rotary offset printing machines to transfer a printed image from an inked plate on a substrate has two shaft extensions for supporting the cylinder in suitable bearings in side walls of a printing machine. The cylinder has a replaceable sleeve 2 thereon. The replaceable sleeve 2 has a substrate or carrier layer 5 and a volume compressible coating layer 3. A cover layer 4 is applied on top of the volume compressible layer 3.

In accordance with the present invention, microcells or micropores are formed in the volume compressible layer 3, are located within the material, and formed during application of the layer 3; they are not applied externally from the outside.

The cover layer 4 is not strictly necessary but is usually provided.

The cylindrical body 1 may be, itself, a hollow cylindrical sleeve-like structure; the sleeve 2 likewise, may be a separate cylindrical structure. Either one of the cylindrical structures may be made of plastic, for example reinforced with carbon or graphite fibers or the like; the carrier 5 may also be a metallic tube or sleeve, for example made of aluminum. The wall thickness of the carrier 5, depending on the material, is, preferably, between 0.02 and 0.3 mm.

The volume compressible layer 3, which forms the base for the cover layer 4, is, preferably, a material based on a polyol, such as polyurethane; or a material based on a silicone. Layer 3, preferably, has a thickness of between 1 to 5 mm, although it may be somewhat thinner or thicker. The top cover layer 4, if used, can be applied on the volume compressible base layer 3. Cover layer 4 is not volume compressible and may, for example, be made of a material based on polyurethane, or based on rubber. The thickness of the layer 4 is usually less than 0.5 mm and may be as small as only a few hundredths mm.

In accordance with a feature of the invention, the materials used to generate the volume compressible base layer 3 are exothermic upon cross-linking by addition of cross-linking or curing agents, which means that, upon cross-linking, heat is generated.

The base layer 3, in accordance with a feature of the invention, will have microcells or micropores of less than 0.01 mm diameter. The volumetric portion of the cells should be greater than 50% and, preferably, the number of their occurrence should increase towards the outer circumference. The volume compressible layer 3 has a density of between about 0.30 $g/cm^3$ and 0.65 $g/cm^3$. The rise time or build-up time of the material of the volume compressible layer 3 should be between about 2 and 15 seconds. The portion of closed pores or cells formed upon manufacture of the layer should be greater than the portion of the pores or cells which are open; in other words, there should be more closed pores than pores which are connected by ducts or channels or other communication, or which terminate at the surface. Thus, the percentage of closed cells of the total cells will be greater than 50%.

The contacting portion of the compact cover layer 4 on the composite layer is, preferably, greater than 50%. The damping of the volume compressible layer 3 is smaller than 25%, or, in other words, the rebound elasticity, which is the reciprocal, greater than 75%. The volume compressible layer 3 permits, in a desirable manner, consideration of spring characteristics in printing. From a spring diagram of surface pressure, width of printing impression lines, and the path distance thereto, the specific desired characteristics can be determined. The size of the cells or pores should be less than 0.01 mm, and the relationship of pore volume to the volume of the wall thickness, that is, the thickness of the substance of the wall surrounding the pores, should be greater than 1.5:1 and, preferably, about 2.5:1. The rebound or bounce-back elasticity, i.e. recovery after a compressive force has been released, will be more than 95%, and the remanent deformation due to pressure will be less than 5% and, desirably and preferably, usually less than 2%.

It is a specific advantage of the sleeve construction that the layer is volume compressible throughout the entire thickness thereof.

Method of making the volume compressible sleeve

In accordance with a preferred feature of the invention, a thixotropic base material, provided in form of a gel within a container is stirred until it becomes readily flowable and liquid. Due to the thixotropic characteristics of the material, it will revert to a gel after stirring. The material, further, can be filled, thickened and reinforced by additives to increase its consistency and "body". In accordance with the invention, the volume compressible layer is applied in liquid form of the thixotropic material on the carrier sleeve, preferably by rotating and axially feeding the carrier sleeve, so that the material is applied in spiral layers, and can still flow so that no bulges, ridges, or free spots will form. The material, then, solidifies. By use of suitable hardeners, the solidifying step can be controlled.

In accordance with the invention, generally, a cylindrical carrier sleeve is provided for rotary printing machines, particularly offset printing machines, which have a continuous, that is seamless, coating of plastic material which is formed with separate micropores or microcells which are not connected among each other.

A suitable thixotropic material is a material based on a polyol with silicic acid. Suitable additives are chalk or talcum.

In contrast to known processes, the invention provides the possibility to form a volume compressible layer which can foam freely as it is applied, that is, it does not require a molding form, as known methods do. By use of expanding agents, which includes materials commonly referred to as blowing agents or foaming agents and inhibitors, the characteristics of the material using the foregoing process can be controlled by suitable stirring and adding of curing or hardening agents, so that the desired size and number of micropores or microcells will result. The hardeners to be used influence the resting or curing time which, preferably, is between 2 to 10 seconds. The expanding or blowing agents and the inhibitors, which also are operative as activators, initiate and will result in a closed structure, for example at the surface, forming an elastic foam. The volume, compactness, size of cells, proportion of cell walls to overall volume, and the proportion of cells to overall volume can be varied within wide ranges, easily determined by experiments to provide the desired material. Basically, the present invention provides a cylindrical carrier sleeve for rotary printing machines, particularly offset printing machines, which has a closed, continuous, that is, seamless outer coating of plastic material, formed with separate, that is, not connected microcells or micropores. The process described in detail above is a preferred method of its manufacture.

Inhibitors, as used herein, are activators with indirect action. A suitable inhibitor is a tertiary amine. The inhibitors control gelling of the thixotropic materials which are used. Expanding, blowing, propelling or foaming agents are materials which, themselves, liberate gas, for example methylenechloride.

The cover layer 4 can be applied in a suitable and well known manner, for example also using the above-described principle and method.

The size of the cells can be influenced decisively by the energy applied during the stirring and the speed of stirring as the material is prepared. The distribution of the space within the layer 3 depends, temporally, on the application time, the foaming rise time, the speed of rotation of the carrier, and the hardening time.

The cover layer 4 is preferably formed by a compact elastomer, with a surface which is a fine smooth surface with the required roughness or, better expressed, the required smoothness. The thickness of the layer 4 can be less than 0.5 mm, and may be made of any suitable material, such as a rubber-based material, a silicone or a polyurethane.

The sleeve 2 so formed has advantages with respect to the construction of printing machines, as well as advantages in use, that is, upon printing. Additionally, it can be made inexpensively.

Seamless offset sleeves are not subjected to the stresses arising on changeable compression and tension loading, which interferes with print quality, register, and output; additionally, they permit a paper path which is gentle on the paper. The power requirement to drive the machine, further, is reduced. It is not necessary to form the machine cylinder which carries the sleeve as a massive solid element, which is frequently the case in current machines. In accordance with the present invention, the volume compressible material does not "knead"; thus, all problems of the formation of bulges, ridges and the like, are eliminated.

The cover, preferably made according to the described method, has a further advantage: From a printing quality point of view, excellent reproduction is obtainable because the impression line only compresses the layer of the carrier material, without spreading out, since no material is displaced. This advantage is obtainable with a seamless or continuous cover, that is, one without being clamped in a clamping groove. As a result, the impression line is precisely transferred from a printing plate on the offset cylinder and by the offset cylinder precisely transferred to the printing substrate. The springy characteristics or resiliency characteristics, namely compression and reset to normal or uncompressed dimension, is a gas dynamic process which is essentially isothermal, that is, no heat of any consequence is liberated. Heating of the gas by compression is balanced by cooling upon expansion of the gas after the compression is released.

The substantially smaller mechanical stresses which are applied on the cover layer 2, and especially the elimination of kneading, and pushing and pulling as well as stretching and clamping of the cover, which occurred in the prior art, and in combination with the highly wear accepting material, provides for long operating time of the cover 2.

The cover can be made quite inexpensively, and has the additional advantage that, due to the circular geometry, it can be easily handled. The shape and the position is predetermined. This is in contrast to blankets which are stretched over a cylinder. Likewise, the size of the cover can be easily predetermined since the material can be so influenced that its behavior, that is, the behavior of the compressible layer upon compression, is determinable. Another advantage which contributes to low cost is that the material cures in an exothermal reaction, that is, it liberates heat. This is in contrast to vulcanizing a rubber blanket, which requires heat. No holding or counter mold or form is necessary as, for example, in the manufacture of generally known polyurethane rollers, which are cast with compact material between a mold core or form and a mold shell.

The invention is particularly applicable to cylindrical carrier sleeves, that is, sleeves which are coated and which can receive printed image subject matter, to replace prior art rubber blankets, for transfer of the printed image on a substrate, for example in the well known offset process. The coating, and the method thereof, in accordance with the present invention may be applied also to other types of cylinders or rollers, for example to any kind of essentially cylindrical elements, for example for image transfer via a cylinder, as well as for other applications, for example as ink application rollers, rollers, or roller elements within various roller trains utilized in printing machines.

EXAMPLE 1

A carrier sleeve of 22 cm diameter and 100 cm length is placed in a holder which permits the carrier sleeve to rotate, and carry out axially longitudinal movement with respect to a coating application head. The cylinder was rotated at a speed of 60 rpm, and fed longitudinally at a rate of 30 meters per hour.

The coating of the thixotropic material was provided by mixing 1 kg polyurethane with 0.370 kg isocyanate, to obtain a gel which, by stirring, was rendered liquid. Additives of talcum of 0.04 kg to increase the "body" were added during mixing.

A foaming agent, namely a FRIGEN (Reg. Trademark) gas of 0.5 kg as well as a curing agent, a tertiary amino compound of 0.05 kg was added to the stirred liquid, and immediately applied by an application head or spreader on the now rotating and axially fed cylinder 5. The cylinder continued to rotate until it was coated through its entire length, and then was continued to be rotated, without application of further coating material, for 2 minutes. The entire process was carried out at room temperature. A coating of 3 mm thickness was obtained. The layer 4 was applied over the foamed layer 3, formed upon curing. Alternatively, the layer 4 can be applied before the layer is entirely cured and while it is still slightly tacky. It can be applied by any well known coating process, for example by casting, by rolling, or by applying with a blade. FRIGEN is a Registered Trademark for fluorocarbon propelling agents available from Hoechst Aktiengesellschaft, Frankfurt/Main, Germany. The layer 4 was formed of compact polyurethane, namely Vulkolan. (Reg. Trademark)

The thickness of the layer 3 was 2.5 mm, the thickness of the layer 4 was 0.5 mm, and the density of the volume compressible layer 3 was 0.4 g/cm$^3$, with a damping of the volume compressible layer 3 of 3% and a rebound elasticity of over 95%.

EXAMPLE 2

A roller as explained in Example 1 was similarly coated, except that the coating composition was: 1 kg of base material with 0.4 kg gel forming material; the foaming or blowing agent and inhibitor were: 0.3 kg of water or a polyvalent alcohol with R11 or R12 gas. R11 and R12 are fluorocarbon refrigerants, the detailed specifications of which are listed in the CRC Handbook of Chemistry and Physics, in the 67th edition, page E32, "Physical properties of fluorocarbon refrigerants", and well known as such. The "R: stands for "refrigerant". The layers 3 and 4 were similar to the layers of Example 1, except that the density was 0.3 g/cm$^3$ and the rebound elasticity was 98%.

EXAMPLE 3

A roller as explained in Example 1 was similarly coated, except that the coating composition was: 1 kg of base material with 0.4 kg gel forming material; the foaming or blowing agent and inhibitor were: 0.3 kg of water or a polyvalent alcohol with R11 gas or R12 gas.

The layers 3 and 4 were similar to the layers of Example 1, except that the density was 0.35 g/cm$^3$ and the rebound elasticity was 96% and 90° Shore A.

I claim:

1. A method of making a cylindrical sleeve structure, said cylindrical sleeve structure having a cylindrical carrier (5) and a seamless, unitary, volume compressible coating layer (3) on said carrier (5), said method comprising providing the cylindrical carrier (5);

providing a thixotropic base substance which includes an expanding agent, and a curing agent, and optionally an agent for controlling gelling of said thixotropic base substance, rendering said thixotropic base substance liquid; and applying said liquid thixotropic base substance on the cylindrical carrier (5) while
(a) rotating the carrier and
(b) relatively axially moving the carrier with respect to the substance as said substance is being applied, thereby applying said substance on the carrier (5) in essentially spiral layer form in a condition in which said substance is still spreadable and sufficiently flowable to form said seamless, unitary, volume compressible coating layer (3) on the carrier (5).

2. The method of claim 1, wherein said step of applying the thixotropic base substance comprises applying the thixotropic base substance in a quantity to result in said coating layer (3) having a density of between about 0.30 g/cm$^3$ and 0.65 g/cm$^3$.

3. The method of claim 1, wherein said thixotropic base substance comprises at least one material selected from the group consisting of:
a polyol based material;
a polyurethane based material; and
a silicone based material.

4. The method of claim 1, further including the step of applying an outer cover layer (4) over the volume compressible coating layer (3).

5. The method of claim 4, wherein said outer cover layer (4) comprises a polyurethane based material or a rubber based material.

6. The method of claim 4, wherein said outer cover layer (4) is applied to provide a cover thickness of less than 0.5 mm.

7. The method of claim 1, wherein said step of applying said thixotropic base substance comprises applying said thixotropic base substance in a quantity to result in said volume compressible coating layer (3) having a thickness of between 1 and 5 mm.

8. The method of claim 1, wherein said carrier (5) comprises plastic or metal having a wall thickness of between about 0.02 and about 0.3 mm.

9. The method of claim 1, wherein the damping of the volume compressible coating layer (3) is less than 25%.

10. The method of claim 1, wherein said volume compressible coating layer (3) has a rebound elasticity of greater than 95%, and a remanent deformation factor of less than 5%.

11. The method of claim 1, wherein said coating layer (3) on said carrier (5), after said applying step, is permitted to cure by action of said curing agent and, when cured, defines a wall substance having a wall thickness surrounding cells or pores formed by action of said expanding agent; and
wherein the ratio of cell or pore volume to volume of wall substance is more than 1.5:1.

12. The method of claim 1, wherein said coating layer on said carrier, after said applying step, is permitted to cure by action of said curing agent and, when cured, defines a wall thickness surrounding cells or pores formed by action of said expanding agent; and
wherein the number of closed cells or pores is more than 50% of the total number of closed and open cells or pores in said coating layer (3).

13. The method of making an offset cylinder for use in a rotary printing machine, comprising
carrying out the method of claim 1,
wherein the carrier forms at least part of said cylinder.

* * * * *